United States Patent
Lee et al.

(10) Patent No.: US 8,659,736 B2
(45) Date of Patent: Feb. 25, 2014

(54) DUAL MODE LIQUID CRYSTAL DISPLAY DEVICE AND A METHOD OF DRIVING A DUAL MODE LIQUID CRYSTAL DISPLAY DEVICE

(75) Inventors: Joong-Ha Lee, Gyeonggi-do (KR); Wook-Sung Kim, Gyeonggi-do (KR); Dong-Guk Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 98 days.

(21) Appl. No.: 13/334,365

(22) Filed: Dec. 22, 2011

(65) Prior Publication Data
US 2012/0300144 A1 Nov. 29, 2012

(30) Foreign Application Priority Data

May 24, 2011 (KR) .................. 10-2011-0049121

(51) Int. Cl.
| | |
|---|---|
| C09K 19/02 | (2006.01) |
| G02F 1/1343 | (2006.01) |
| G02F 1/133 | (2006.01) |
| G02F 1/13 | (2006.01) |

(52) U.S. Cl.
USPC .............. 349/180; 139/33; 139/187; 139/179

(58) Field of Classification Search
USPC ........... 349/139–147, 117–119, 48, 167–186, 349/187–192
See application file for complete search history.

(56) References Cited

U.S. PATENT DOCUMENTS

| | | | |
|---|---|---|---|
| 7,548,290 B1* | 6/2009 | Kitamura et al. | 349/96 |
| 2003/0076455 A1* | 4/2003 | Kwok et al. | 349/99 |
| 2003/0142257 A1* | 7/2003 | Chaudhari et al. | 349/129 |
| 2003/0210365 A1* | 11/2003 | Koyama et al. | 349/113 |
| 2005/0052596 A1* | 3/2005 | Jung et al. | 349/113 |
| 2005/0157225 A1* | 7/2005 | Toyooka et al. | 349/99 |
| 2006/0119756 A1* | 6/2006 | Shin et al. | 349/38 |
| 2009/0237598 A1* | 9/2009 | Nagai | 349/76 |
| 2010/0245700 A1* | 9/2010 | Zhao et al. | 349/48 |
| 2011/0267564 A1* | 11/2011 | Kim et al. | 349/86 |

FOREIGN PATENT DOCUMENTS

| | | | |
|---|---|---|---|
| KR | 10-2006-0086641 A | | 8/2006 |
| KR | 100725218 | * | 6/2007 |
| KR | 100824060 | * | 4/2008 |

* cited by examiner

*Primary Examiner* — Bumsuk Won
*Assistant Examiner* — Jia Pan
(74) *Attorney, Agent, or Firm* — Morgan, Lewis & Bockius LLP

(57) ABSTRACT

A dual mode LCD device includes first and second substrates facing each other; a first electrode on an inner surface of the first substrate and having a plate shape; a first insulating layer on the first electrode; a second electrode and a third electrode on the first insulating layer, being spaced apart from each other and extending along a first direction; a fourth electrode on an inner surface of the second substrate; and a liquid crystal layer interposed between the first and second substrates and including chiral dopants, wherein liquid crystal molecules of the liquid crystal layer are stably arranged in a first twist state and a second twist state, wherein the first and second twist states are used for a memory mode and the second twist state and a vertical alignment state are used for a dynamic mode.

19 Claims, 8 Drawing Sheets

Related Art

DUAL MODE LIQUID CRYSTAL DISPLAY DEVICE AND A METHOD OF DRIVING A DUAL MODE LIQUID CRYSTAL DISPLAY DEVICE

The present application claims the benefit of Korean Patent Application No. 10-2011-0049121 filed in Korea on May 24, 2011, which is hereby incorporated by reference.

BACKGROUND OF THE INVENTION

1. Field of the Invention

The present invention relates to a liquid crystal display device, and more particularly to a dual mode liquid crystal display device convertible between a memory mode and a dynamic mode.

2. Discussion of the Related Art

With the rapid development in information technology, flat panel display (FPD) devices having thin thickness, light weight, and lower power consumption have been introduced and developed.

Among these devices, liquid crystal display (LCD) devices are most widely used for monitors of notebook computers, monitors of personal computers and televisions due to high definition, high qualities, excellent moving images and high contrast ratio.

An LCD device includes two substrates and a liquid crystal layer interposed between the two substrates. Electrodes are formed on respective substrates, and the substrates are disposed such that the electrodes face each other. An electric field is induced between the electrodes when voltages are applied to the electrodes. The alignment direction of the liquid crystal molecules is controlled by varying the intensity of the electric field, and the transmittance of light through the liquid crystal layer is changed to display images.

FIG. 1 is an exploded perspective view of an LCD device according to the related art. As shown in FIG. 1, the LCD device includes an array substrate 10, a color filter substrate 20 and a liquid crystal layer 30. The array substrate 10 and the color filter substrate 20 face each other, and the liquid crystal layer 30 is interposed therebetween.

The array substrate 10 includes gate lines 14 and data lines 16 on an inner surface of a transparent substrate 12. The gate lines 14 and the data lines 16 cross each other such that regions formed between the gate and data lines 14 and 16 are defined as pixel regions P. A thin film transistor Tr is formed at each crossing portion of the gate and data lines 14 and 16, and a pixel electrode 18 is formed in each pixel region P and connected to the thin film transistor Tr.

The color filter substrate 20 includes a black matrix 25, a color filter layer 26, and a common electrode 28 on an inner surface of a transparent substrate 22 facing the array substrate 10. The black matrix 25 has a lattice shape to cover a non-display region such as the gate lines 14, the data lines 16, the thin film transistors Tr, and so on. The color filter layer 26 includes red, green and blue color filter patterns 26a, 26b, and 26c repeatedly arranged in order. Each of the color filter patterns 26a, 26b, and 26c corresponds to each pixel region P. The common electrode 28 is formed on the black matrix 25 and the color filter layer 26 and over an entire surface of the substrate 22.

A sealant (not shown) is formed along peripheries of the array substrate 10 and the color filter substrate 20 to prevent liquid crystal molecules of the liquid crystal layer 30 from leaking An alignment layer (not shown) is formed between the liquid crystal layer 30 and each of the array substrate 10 and the color filter substrate 20 to determine an initial direction of the liquid crystal molecules. First and second polarizers (not shown) are disposed on outer surfaces of the array substrate 10 and the color filter substrate 20, respectively. A backlight unit (not shown) is disposed over an outer surface of the array substrate 10 to provide light.

Scan signals for turning on/off the thin film transistors Tr are sequentially applied to the gate lines 14, and data signals are applied to the pixel electrodes 18 in the selected pixel regions P through the data lines 16. An electric field perpendicular to the substrates 12 and 22 is induced between the pixel electrodes 18 and the common electrode 28. The arrangement of the liquid crystal molecules is controlled by the electric field, and the transmittance of light is changed by varying the arrangement of the liquid crystal molecules to thereby display various images.

In the LCD device, the liquid crystal molecules may exhibit nematic, smectic or cholesteric phases. Among these, the nematic phase has been most widely used because light is strongly scattered when the liquid crystal molecules are dispersed.

The electro optic effect of the liquid crystal means a phenomenon of generating optical modulation by changing optical characteristics of a liquid crystal cell and is caused by a change in arrangements of the liquid crystal molecules due to an electric field.

In the nematic phase, the arrangements of the liquid crystal molecules are continuously changed when an electric field is applied. A twisted nematic (TN) mode and a super twisted nematic type (STN) mode are widely used for an LCD device including a nematic phase liquid crystal.

A TN mode LCD device includes a liquid crystal panel where nematic phase liquid crystal molecules are disposed between transparent electrodes which are surface-treated to have an angle of 90 degrees with respect to each other. The liquid crystal molecules are parallel to the electrodes and are continuously twisted by 90 degrees from one electrode to another.

Meanwhile, to increase viewing angles, an in-plane switching mode LCD device has been suggested in which a common electrode and a pixel electrode are formed on the same substrate. The liquid crystal molecules are rotated by a horizontal electric field parallel to the substrate.

Recently, various types of LCD devices have been developed to satisfy needs of consumers. Specially, LCD devices having further thin thickness, light weight and high efficiency have been proposed to watch moving images or to read texts when they move.

Therefore, it is needed to provide an LCD device including a dynamic mode for watching moving images and a memory mode for reading texts.

An LCD device including a dynamic mode and a memory mode according to the related art uses bistable states of a splay state and $-\pi$ twist state for the memory mode and switching between a low bend state and a high bend state for the dynamic mode. This LCD device may be referred to as a bistable chiral splay nematic (BCSN) mode LCD device.

The BCSN mode LCD device includes different black states for the memory mode and the dynamic mode. Thus, it is difficult to design a compensation film for satisfying both the memory mode and the dynamic mode.

Namely, a black property is optimized for only one of the memory mode and the dynamic mode. The black property for the other mode is lowered, and the contrast ratio is also lowered. The LCD device of high qualities is not provided.

SUMMARY OF THE INVENTION

Accordingly, the present invention is directed to a dual mode LCD device that substantially obviates one or more of the problems due to limitations and disadvantages of the related art.

An advantage of the present invention is to provide a dual mode LCD device that produces optimized black states in a memory mode and a dynamic mode and provides images of excellent qualities with high contrast ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a dual mode liquid crystal display device including a memory mode and a dynamic mode includes first and second substrates facing each other and including a display area and a non-display area; a first electrode on an inner surface of the first substrate and having a plate shape; a first insulating layer on the first electrode; a second electrode and a third electrode on the first insulating layer, the second and third electrodes being spaced apart from each other and extending along a first direction; a fourth electrode on an inner surface of the second substrate; and a liquid crystal layer interposed between the first and second substrates and including chiral dopants, wherein liquid crystal molecules of the liquid crystal layer are stably arranged in a first twist state and a second twist state, wherein the first and second twist states are used for the memory mode and the second twist state and a vertical alignment state, in which the liquid crystal molecules are vertically arranged with respect to the first and second substrates, are used for the dynamic mode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiment, an example of which is illustrated in the accompanying drawings.

Figure 1:
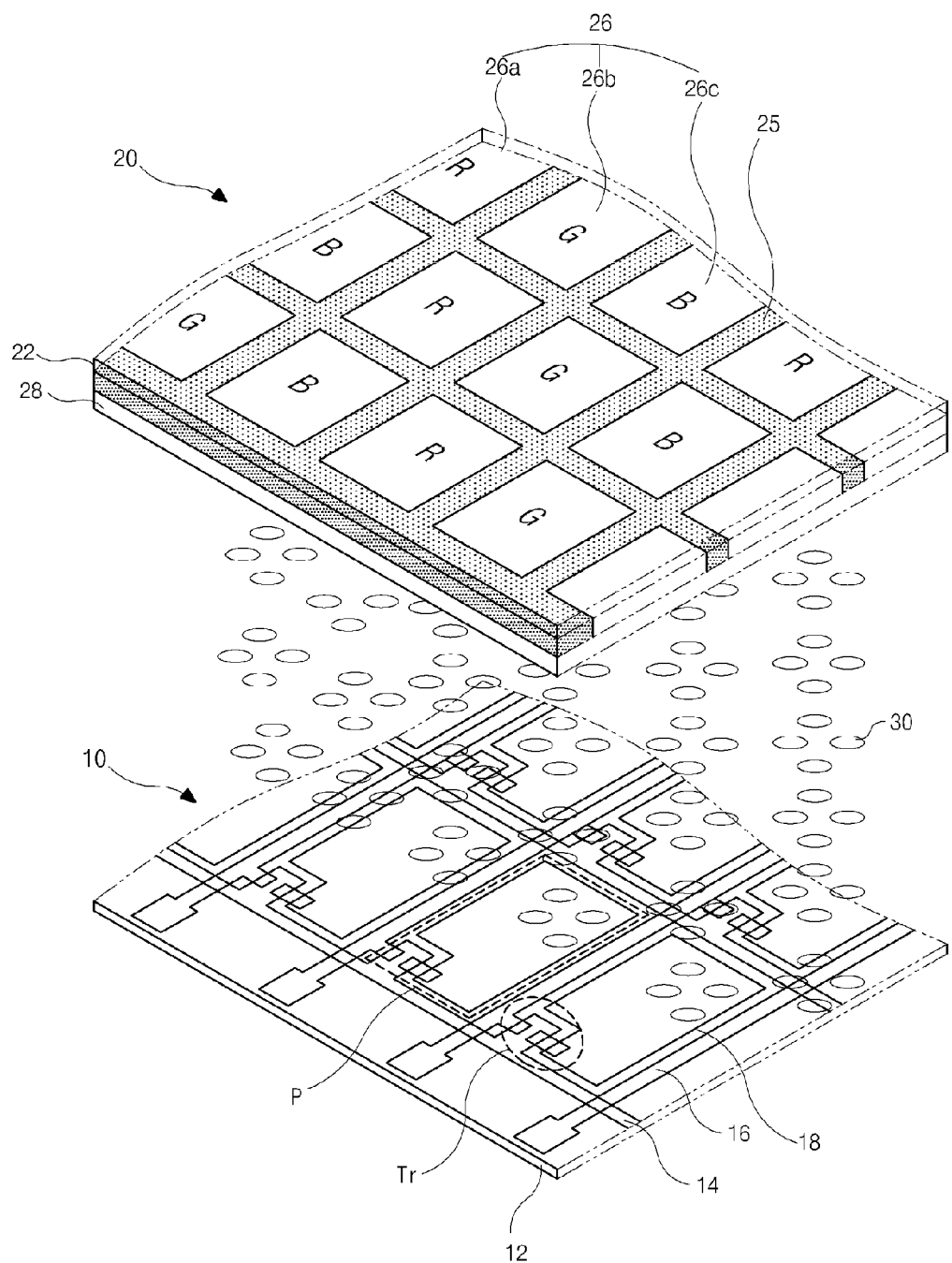
FIG. 1 is an exploded perspective view of an LCD device according to the related art.
Figure 2:
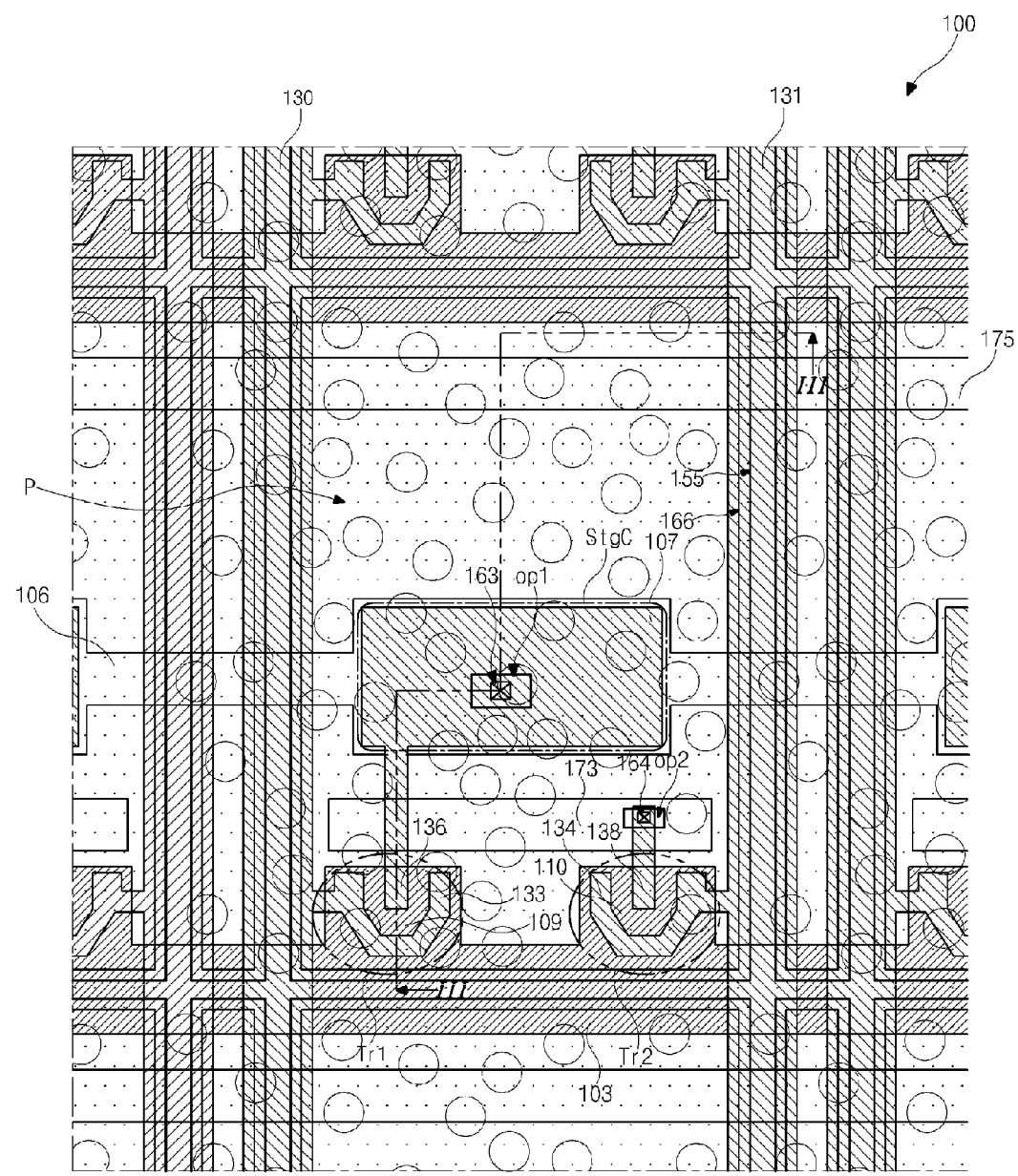
FIG. 2 is a plan view of illustrating a pixel region of an array substrate for a reflective dual mode liquid crystal display device according to an exemplary embodiment of the present invention.
Figure 3:
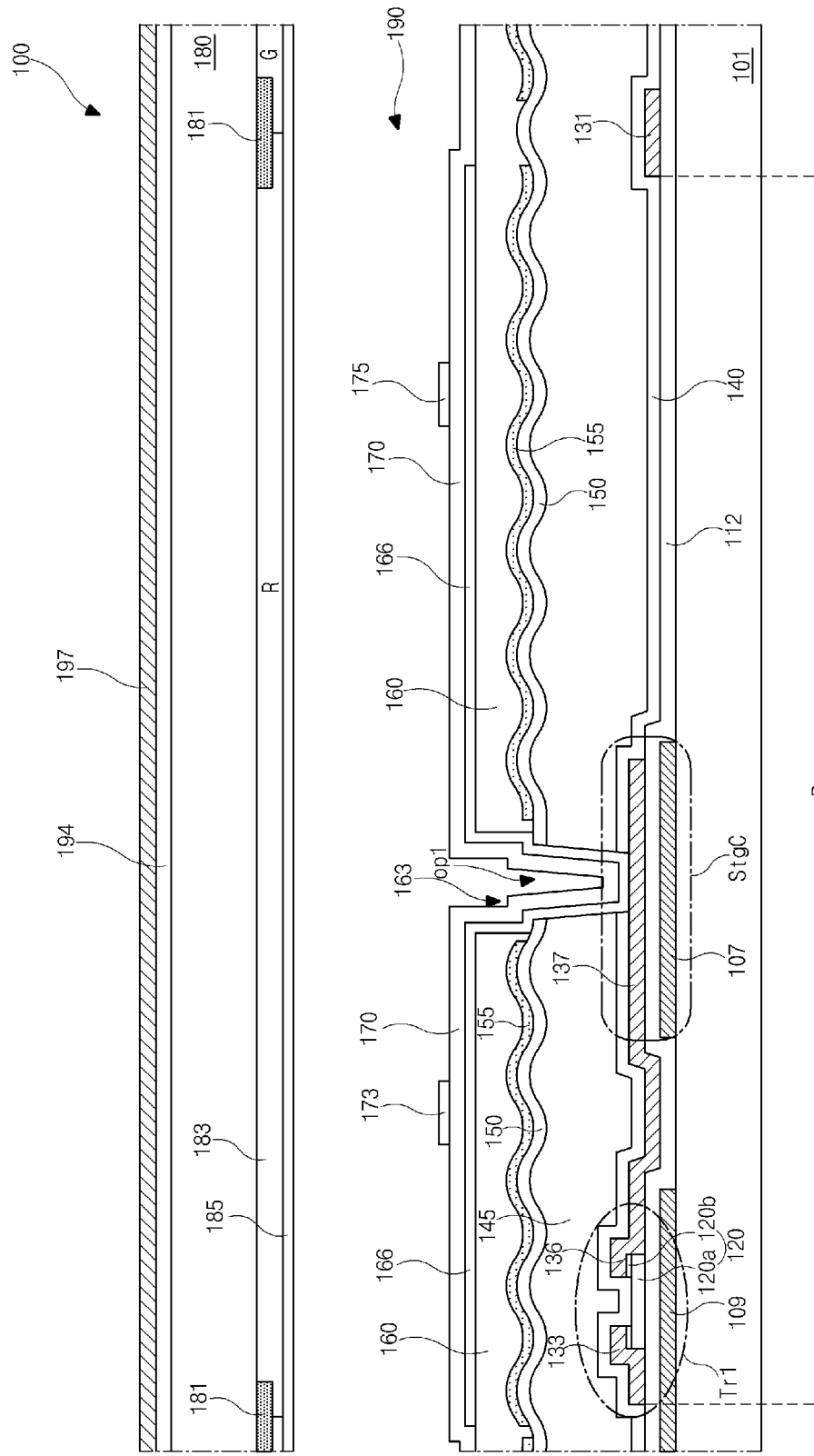
FIG. 3 is a cross-sectional view taken along line III-III of FIG. 2.

FIG. 2 is a plan view of illustrating a pixel region of an array substrate for a reflective dual mode liquid crystal display device according to an exemplary embodiment of the present invention. FIG. 3 is a cross-sectional view taken along line III-III of FIG. 2.

In FIG. 2 and FIG. 3, the dual mode liquid crystal display device 100 has a plurality of pixel regions P and includes a first substrate 101, a second substrate 180, and a liquid crystal layer 190 interposed between the first and second substrates 101 and 180. A thin film transistor Tr, first, second and third electrodes 166, 173 and 175, and a reflector 155 are formed in each pixel region P on the first substrate 101. A fourth electrode 185 is formed on the second substrate 180.

The liquid crystal layer 190 includes chiral dopants. An amount of the chiral dopants is an average value of d/p values such that two twist states of the liquid crystal layer are the lowest energy states due to the chiral dopants and the liquid crystal layer is stable in the twist states. Here, "d" is a thickness of the liquid crystal layer and "p" is a pitch of a helical structure of the liquid crystal layer.

At this time, when liquid crystal molecules of the liquid crystal layer are stably twisted in ±a degree and ±a±nπ degree directions, the chiral dopants may be added such that the d/p value is within a range of −0.04 to −0.013.

For example, when the liquid crystal molecules are stably twisted in 80 degree and −100 degree directions for a memory mode, the d/p value due to the chiral dopants may be −0.027.

First, the first substrate 101 may be formed of transparent glass or may be formed of transparent flexible plastic or film. A gate line 103 and first and second data lines 130 and 131 are formed on the first substrate 101 with a gate insulating layer 112 between the gate line 103 and the first and second data lines 130 and 131. The gate line 103 crosses the first and second data lines 130 and 131 to define the pixel region P. A common line 106 is formed on the first substrate 101 across the pixel region P and is parallel to the gate line 103. The common line 106 includes a first storage electrode 107, which is a wider width than other portions of the common line 106.

A first thin film transistor Tr1 is formed at a crossing portion of the gate line 103 and the first data line 130 as a switching element. The first thin film transistor Tr1 includes a first gate electrode 109, the gate insulating layer 112, a first semiconductor layer 120, a first source electrode 133 and a first drain electrode 136. The first gate electrode 109 is connected to the gate line 103. The first semiconductor layer 120 includes a first active layer 120a of intrinsic amorphous silicon and first ohmic contact layers 120b of impurity-doped amorphous silicon. The first source electrode 133 is connected to the first data line 130, and the first drain electrode 136 is spaced apart from the first source electrode 133.

A second storage electrode 137 extends from the first drain electrode 136 of the first thin film transistor Tr1 and overlaps the first storage electrode 107. The first storage electrode 107, the second storage electrode 137, and the gate insulating layer 112 interposed therebetween constitute a storage capacitor StgC.

In addition, a second thin film transistor Tr2 is formed at a crossing portion of the gate line 103 and the second data line 131 as a switching element. The second thin film transistor Tr2 includes a second gate electrode 110, the gate insulating layer 112, a second semiconductor layer (not shown), a second source electrode 134 and a second drain electrode 138. The second gate electrode 110 is connected to the gate line 103. The second semiconductor layer includes a second active layer (not shown) of intrinsic amorphous silicon and second ohmic contact layers (not shown) of impurity-doped amorphous silicon. The second source electrode 134 is connected to the second data line 131, and the second drain electrode 138 is spaced apart from the second source electrode 134.

A first passivation layer 140 is formed of an inorganic insulating material and covers the first and second thin film transistors Tr1 and Tr2, the storage capacitor StgC, and the first and second data lines 130 and 131. A second passivation layer 145 of an organic insulating material is formed on the first passivation layer 140 all over. The second passivation layer 145 has an uneven top surface.

A third passivation layer 150 of an inorganic insulating material is formed on the second passivation layer 145. The reflector 155 is formed on the third passivation layer 150 at the pixel region P. The reflector 155 includes a metallic material having relatively high reflectance such as aluminum (Al) or aluminum alloy. The reflector 155 may correspond to the whole pixel region P and overlap the gate line 103 and the first and second data lines 130 and 131.

Each of the third passivation layer 150 and the reflector 155 has an uneven surface of an embossing structure due to the second passivation layer 145.

The reflector 155 may have the uneven surface so that mirror reflection may be restrained and reflected light may go into eyes of a user to increase reflectance and to improve visibility.

Although the reflector 155 of the present invention has the surface of the embossing structure, the reflector 155 may have a flat surface.

Meanwhile, the reflector 155 has first and second openings op1 and op2 exposing the third passivation layer 150. The first and second openings op1 and op2 are formed to provide first and second drain contact holes 163 and 164, which pass through the first and second openings op1 and op2 and expose the first and second drain electrodes 136 and 138 of the first and second thin film transistors Tr1 and Tr2, respectively.

In the embodiment of the present invention, the first, second and third passivation layers 140, 145 and 150 are formed, and the first and third passivation layers 140 and 150 may be omitted.

The first passivation layer 140 of the inorganic insulating material contacts the first active layer 120a and the second active layer (not shown) and prevents contamination of channels and lowering in properties of the thin film transistors Tr1 and Tr2, which may be caused if the active layers 120a and (not shown) contact the organic insulating material. The third passivation layer 150 of the inorganic insulating material is formed between the reflector 155 of the metallic material and the second passivation layer 145 of the organic insulating material to solve poor adhesion between the organic insulting material and the metallic material A fourth passivation layer 160 of an organic insulating material or an inorganic insulating material is formed on the reflector 155. The fourth passivation layer 160 has a thickness of more than 1 micrometer and has a flat top surface without unevenness. The fourth passivation layer 160 is formed to prevent a thickness of the liquid crystal layer from being fluctuated due to the uneven surface of the reflector 155. If the reflector 155 has a flat surface, the fourth passivation layer 160 may be omitted.

In the meantime, if the fourth passivation layer 160 is formed of an organic insulating material, a fifth passivation layer (not shown) may be further formed between the reflector 155 and the fourth passivation layer 160 to increase an adhesion property therebetween.

As stated above, when the first, second, third and fourth passivation layers 140, 145, 150 and 160 are formed, the first drain contact hole 163 is formed in the passivation layers 140, 145, 150 and 160 passing through the first opening op1 of the reflector 155 and exposes the second storage electrode 137. If the fifth passivation layer (not shown) is further formed, the first drain contact hole 163 is also formed in the fifth passivation layer.

The first electrode 166 is formed on the fourth passivation layer 160 or the fifth passivation layer in the pixel region P. The first electrode 166 contacts the second storage electrode 137 through the first drain contact hole 163 and has a plate shape corresponding to the pixel region P. The first electrode 166 substantially wholly overlaps the reflector 155. The first electrode 166 may be formed of a transparent conductive material such as indium tin oxide (ITO) or indium zinc oxide (IZO).

The first electrode 166 includes a third opening (not shown) corresponding to the second opening op2 of the reflector 155.

Meanwhile, dummy patterns may be formed between adjacent pixel regions P. The dummy patterns may be formed of the same materials and on the same layers as the reflector 155 and the first electrode 166. The dummy patterns cover a space between adjacent data lines and overlap the adjacent data lines. The dummy patterns may be omitted.

Next, a sixth passivation layer 170 of inorganic insulating material is formed on the first electrode 166 all over a display area. The sixth passivation layer 170 includes the second drain contact hole 164 exposing the second drain electrode 138 of the second thin film transistor Tr2 with the first, second, third and fourth layers 140, 145, 150 and 160 thereunder.

The second electrode 173 is formed on the sixth passivation layer 170. The second electrode 173 contacts the second drain electrode 138 of the second thin film transistor Tr2 through the second drain contact hole 164. The second electrode 173 is parallel to the gate line 103 and is disposed between the first and second data lines 130 and 131.

Additionally, the third electrode 175 is formed on the sixth passivation layer 170. The third electrode 175 is spaced apart from and parallel to the second electrode 173 and passes through the pixel regions P. Accordingly, the first substrate 101 is completed.

All the third electrodes 175 in the display area may be connected to an auxiliary line (not shown), which is formed outside the display area, and may be supplied with a first voltage through the auxiliary line at the same time.

The second and third electrodes 173 and 175 may be formed of a transparent conductive material such as indium tin oxide or indium zinc oxide, for example.

Although not shown in the figures, a first alignment layer is formed on the second and third electrodes 173 and 175 and the sixth passivation layer 170 all over the display area. The first alignment layer may be rubbed at an angle of 40 degrees counterclockwise with respect to the gate line 103.

In the embodiment of the present invention, the first and second thin film transistors Tr1 and Tr2 are formed in the pixel region P and are connected to the gate line 103 and the first and second data lines 130 and 131. Alternatively, first and second thin film transistors may be formed in on pixel region, the first thin film transistor may be connected to a first gate line and a data line, and the second thin film transistor may be connected to a second gate line and the data line.

The fourth electrode 185 is formed over a substantially entire inner surface of the second substrate 180, which faces the first substrate 101 including the above-mentioned structure. The fourth electrode 185 includes a transparent conductive material and has a flat surface.

A color filter layer 183 is formed between the second substrate 180 and the fourth electrode 185. The color filter layer 183 may include red, green and blue color filter patterns, which are sequentially repeatedly arranged and correspond to respective pixel regions P.

A black matrix 181 may be further formed between the second substrate 180 and the fourth electrode 185. The black matrix 181 may correspond to the gate line 103 and the data lines 130 and 131.

Although not shown in the figures, a second alignment layer is formed over the second substrate 180 all over the display area to cover the fourth electrode 185. The second alignment layer may be rubbed at an angle of 40 degrees clockwise with respect to the gate line 103.

The liquid crystal layer 190 interposed between the first substrate 101 and the second substrate 180 has a nematic phase and includes the chiral dopants such that liquid crystal molecules are twisted. A compensation film 194 is attached to an outer surface of the second substrate 180.

A polarizer 197 is attached to an outer surface of the compensation film 195. Therefore, the dual mode liquid crystal display device 100 of the present invention is completed.

When an absorption axis of the polarizer 197 is defined as zero degree, the compensation film 194 may have a slow axis of 70 degrees. The compensation film 194 may have a retardation value of 189 nm to 191 nm, more specifically about 190 nm based on a wavelength of 550 nm. Alternatively, the compensation film 194 may include first and second retardation films, which have slow axes of 70 degrees and have retardation values of 40 nm and 150 nm, respectively, based on a wavelength of 550 nm.

Hereinafter, operation of the dual mode liquid crystal display device 100 according to the embodiment of the present invention will be described.

Figure 4:
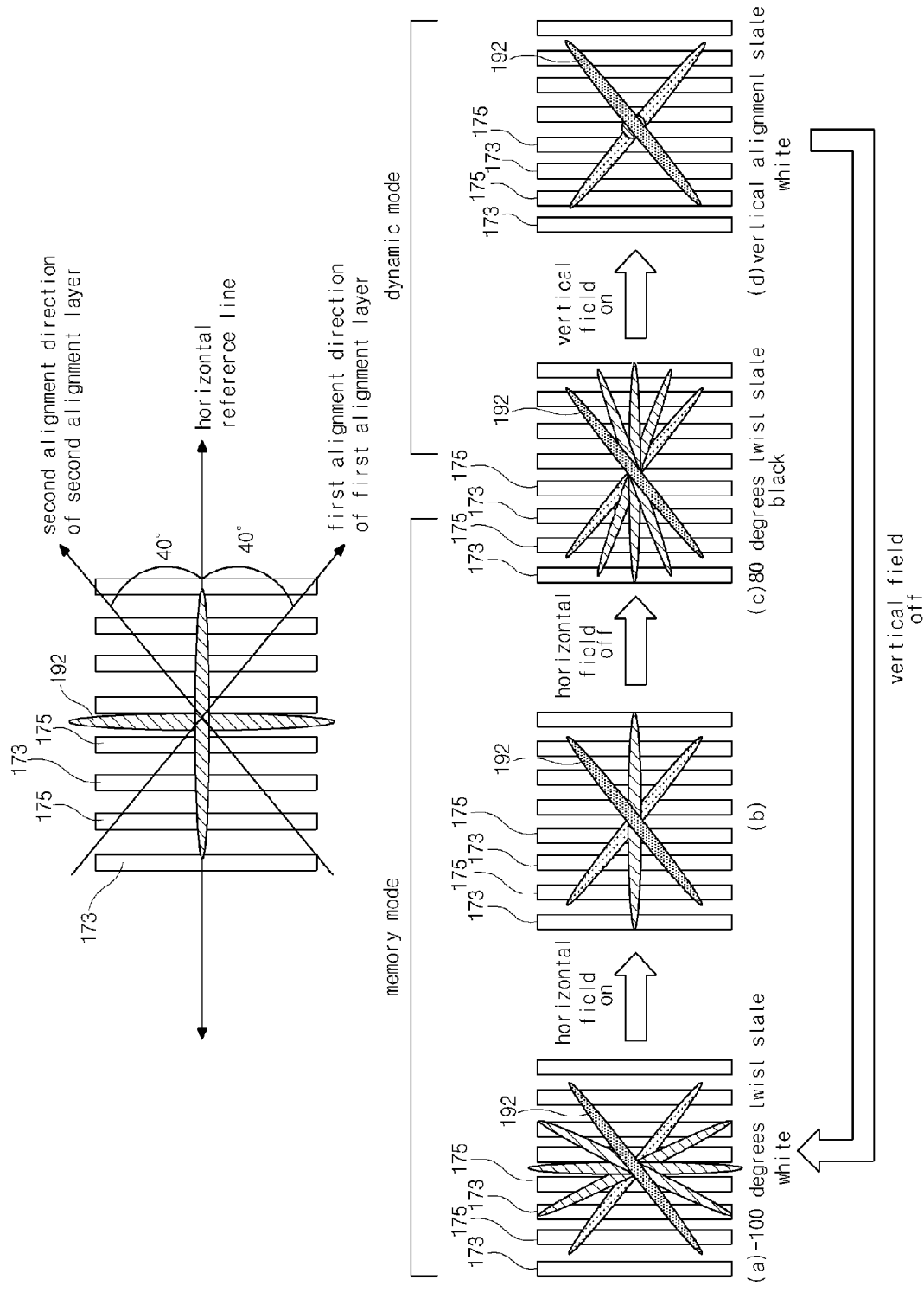
FIG. 4 is a view of illustrating driving states in memory and dynamic modes of a dual mode liquid crystal display device according to the embodiment of the present invention.

FIG. 4 is a view of illustrating driving states in memory and dynamic modes of a dual mode liquid crystal display device according to the embodiment of the present invention. FIG. 4 shows arrangements of the liquid crystal molecules and the second and third electrodes 173 and 175 when the device is viewed at the front. For convenience of explanation, the liquid crystal molecules are differently hatched depending on their positions: one adjacent to the first substrate, one adjacent to the second substrate, and ones in the middle of the liquid crystal layer.

In the dual mode liquid crystal display device 100 of the present invention, the second and third electrodes 173 and 175 are formed on the first substrate of FIG. 3 and parallel to each other. A first alignment direction of the first alignment layer (not shown) on the first substrate 101 of FIG. 3 has an angle of 80 degrees with a second alignment direction of the second alignment layer (not shown) on the second substrate 180 of FIG. 3.

At this time, the first alignment direction of the first alignment layer has an angle of −40 degrees with the gate line 103 of FIG. 3, which is perpendicular to the second and third electrodes 173 and 175 and corresponds to a horizontal reference line in the figure. The second alignment direction of the second alignment layer has an angle of −40 degrees with the gate line 103 of FIG. 3.

The dual mode liquid crystal display device includes a memory mode and a dynamic mode. The memory mode uses two twist states as bistable states, and the dynamic mode uses one of the twist states and a bend state.

Namely, the dual mode liquid crystal display device uses three states of an 80 degree twist state, a −100 degree twist state and a vertical alignment state to operate in the memory mode and the dynamic mode.

Therefore, black states of the memory mode and the dynamic mode are the same by using one of the twist states in both the memory mode and the dynamic mode and producing black.

For example, when the 80 degree twist state is used as the black state, in the memory mode, the 80 degree twist state produces black, and the −100 degree twist state produces white. In the dynamic mode, the 80 degree twist state produces black like the memory mode, and the vertical alignment state produces white. Thus, the black states of two modes are the same.

When the dual mode liquid crystal display device of the present invention is driven in the memory mode, the liquid crystal molecules 192 of the liquid crystal layer are twisted by −100 degrees as shown in (a) of FIG. 4, and white is produced. A horizontal field, which is an electric field parallel to the substrates, is induced between the second and third electrodes 173 and 175 by applying voltages to the second and third electrodes 173 and 175 as shown in (b) of FIG. 4, and the liquid crystal molecules 192 in the middle of the liquid crystal layer are arranged parallel to the horizontal field and the substrates. Then, the horizontal field is off, and the liquid crystal molecules 192 are twisted by 80 degrees as shown in (c) of FIG. 4 to thereby produce black.

In the present invention, since the nematic phase liquid crystal layer includes the chiral dopants such that the d/p value due to the chiral dopants is within a range of −0.04 to −0.013, the liquid crystal layer is very stable in the 80 degree twist state and the −100 degree twist state and is able to maintain the states after that. Accordingly, the liquid crystal layer has semipermanent memory properties.

Meanwhile, when the dual mode liquid crystal display device of the present invention is driven in the dynamic mode, a first voltage of 1V to 10V is applied between the first electrode (not shown) and the fourth electrode (not shown) in the 80 degree twist state producing black, and a vertical field, which is vertical to the substrates, is induced. The liquid crystal molecules are arranged vertically to the substrates as shown in (d) of FIG. 4 to thereby produce white.

In the white state due to the vertical field, grey levels may be controlled by selecting the first voltage within a range of 1V to 10V.

Then, a second voltage higher than the first voltage is applied between the first and fourth electrodes in the vertical alignment state producing white, and the vertical field is off. The liquid crystal molecules 192 are twisted by −100 degrees as the white state of the memory mode. The second voltage may be within a range of 11V to 25V.

Therefore, mode conversion the present invention can be achieved according to the above mentioned method.

In the dual mode liquid crystal display device of the present invention, since the liquid crystal layer is very stable in the 80 degree twist state and −100 degree twist state, the 80 or −100 degree twist state of the liquid crystal layer may be maintained unless the vertical field is induced between the first and fourth electrodes.

Accordingly, the dual mode liquid crystal display device is driven in the memory mode such that the 80 degree twist state produces black and the −100 degree twist state produces white while no vertical field is applied. The dual mode liquid crystal display device can display the same image and/or text for a long time without continuously applying voltages. The power consumption can be minimized.

The dual mode liquid crystal display device driven in the memory mode can be used for e-books or e-papers, which display the same text for several milliseconds to several hours. The dual mode liquid crystal display device has an advantage of carrying it without charging for a long time because of its memory function that the same state is maintained without applying voltages.

In summary, the dual mode liquid crystal display device of the present invention is designed to produce black at the 80 degree twist state. In the 80 degree twist state, when the strong vertical field is induced between the first and fourth electrodes due to the voltage difference of 11V to 25V and then is off, the device is converted into the −100 degree twist state to thereby produce white. In the −100 degree twist state, when the horizontal field is induced between the second and third electrodes and then is off, the device is put in the 80 degree twist state, thereby maintaining the black state. Therefore, the memory mode is realized.

Additionally, in the 80 degree twist state of producing black, when the vertical field is induced between the first and fourth electrodes such that the voltage difference is within a range of 1V to 10V, the device is put in the vertical alignment state, thereby producing white. At this time, grey levels may be displayed by changing the voltage difference in the range. Therefore, the dynamic mode is realized.

As mentioned above, when the dual mode liquid crystal display device of the present invention is driven in the memory mode and the dynamic mode, black is produced in the 80 degree twist state where the liquid crystal molecules 192 are twisted by 80 degrees. The two modes have the same black state.

Therefore, the compensation film 194 is designed considering the black state for the memory mode and the dynamic mode of the dual mode liquid crystal display device of the present invention. In both the memory mode and the dynamic mode, optimized black and white having a relatively high contrast ratio with respect to the black can be displayed. The display qualities are improved.

In the present invention, even though the liquid crystal layer is stable in the 80 degree twist state and the −100 degree twist state, stable twist states may be varied by adjusting the dopants added in the liquid crystal layer.

That is, when the d/p value is within a range of −0.04 to −0.013 by controlling the dopants added into the liquid crystal layer, the liquid crystal molecules of the liquid crystal layer may be semipermanantly stably twisted in ±a degree and ±a±nπ degree directions. Here, "d" is a thickness of the liquid crystal layer, "p" is a pitch of a helical structure of the liquid crystal layer, "a" is an angle between the first alignment direction of the first alignment layer and the second alignment direction of the second alignment layer, and "n" is a natural number.

The dual mode liquid crystal display device is driven in the memory mode by producing black in one of the ±a degree and ±a±nπ degree twist states and producing white in the other. The twist state for producing black is also used as the black state of the dynamic mode. In the twist state for producing black, a voltage of 1V to 11V is applied between the first and fourth electrodes facing each other vertically with respect to the substrates, and a relatively weak vertical field is induced between the first and fourth electrodes to produce white. The grey levels may be displayed depending on the value of the voltage. Thus, superior black property and contrast ratio can be achieved.

Figure 5:
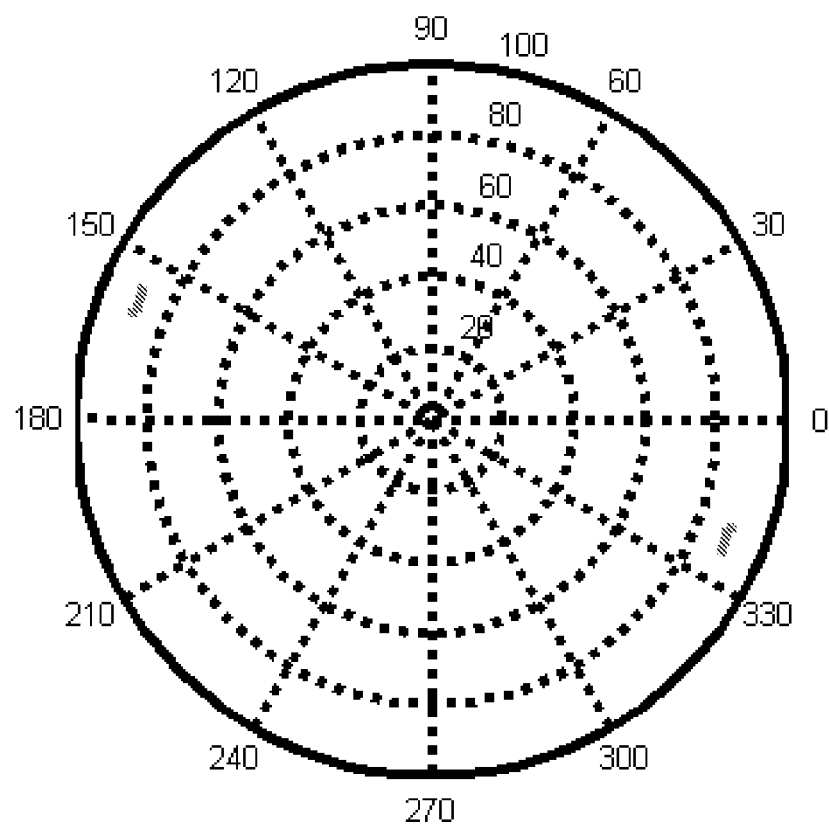
FIG. 5 is a graph of showing results of viewing angles in a memory mode of a dual mode liquid crystal display device according to the exemplary embodiment of the present invention.
Figure 6:
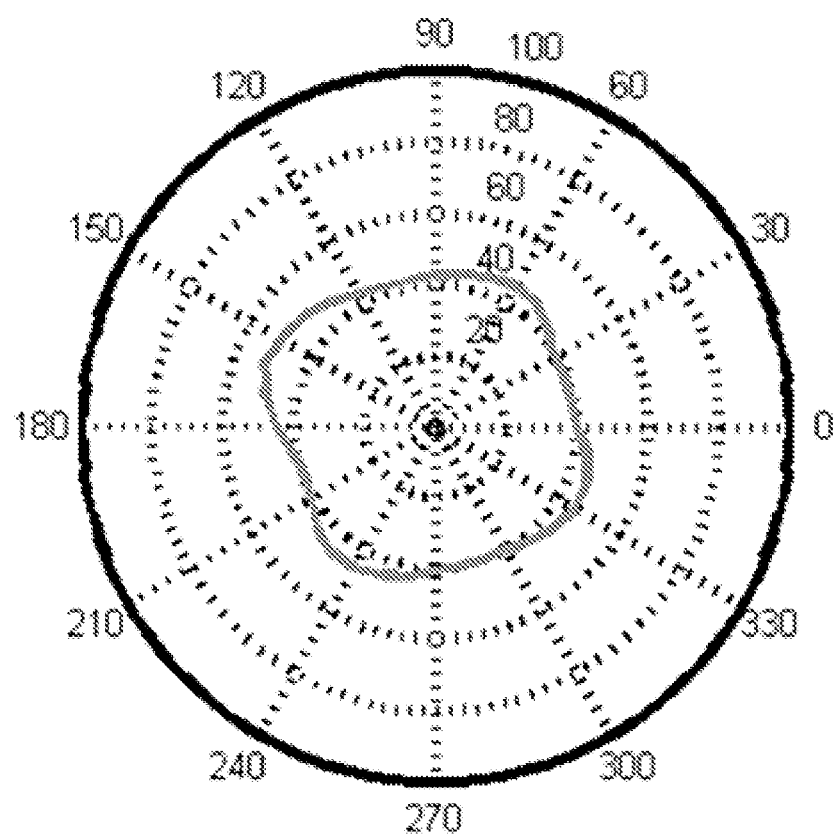
FIG. 6 is a graph of showing results of viewing angles in a memory mode of a related art liquid crystal display device as a comparative example.

FIG. 5 is a graph of showing results of viewing angles in a memory mode of a dual mode liquid crystal display device according to the exemplary embodiment of the present invention, and the dual mode liquid crystal display device is driven in memory and dynamic modes by using an 80 degree twist state, a −100 degree twist state and a vertical alignment state of a liquid crystal layer. FIG. 6 is a graph of showing results of viewing angles in a memory mode of a related art liquid crystal display device as a comparative example, and the related art liquid crystal display device is driven in memory and dynamic modes by using a splay state, a twist state, a bend state and a vertical alignment state of a liquid crystal layer.

Referring to FIG. 5, the dual mode liquid crystal display device according to the present invention has excellent viewing angle properties within a range of −90 to +90 degrees left and right and within a range of −90 to +90 degrees up and down when the device is driven in the memory mode. On the other hand, in FIG. 6, the related art liquid crystal display device has excellent viewing angle properties within a range of −40 to +40 degrees left and right and within a range of −40 to +40 degrees up and down, and the related art liquid crystal display device has low viewing angle properties within the other ranges, i.e., within a range of −90 to −40 degrees and within a range of +40 to +90 degrees left and right and within a range of −90 to −40 degrees and within a range of +40 to +90 degrees up and down.

Figure 7:
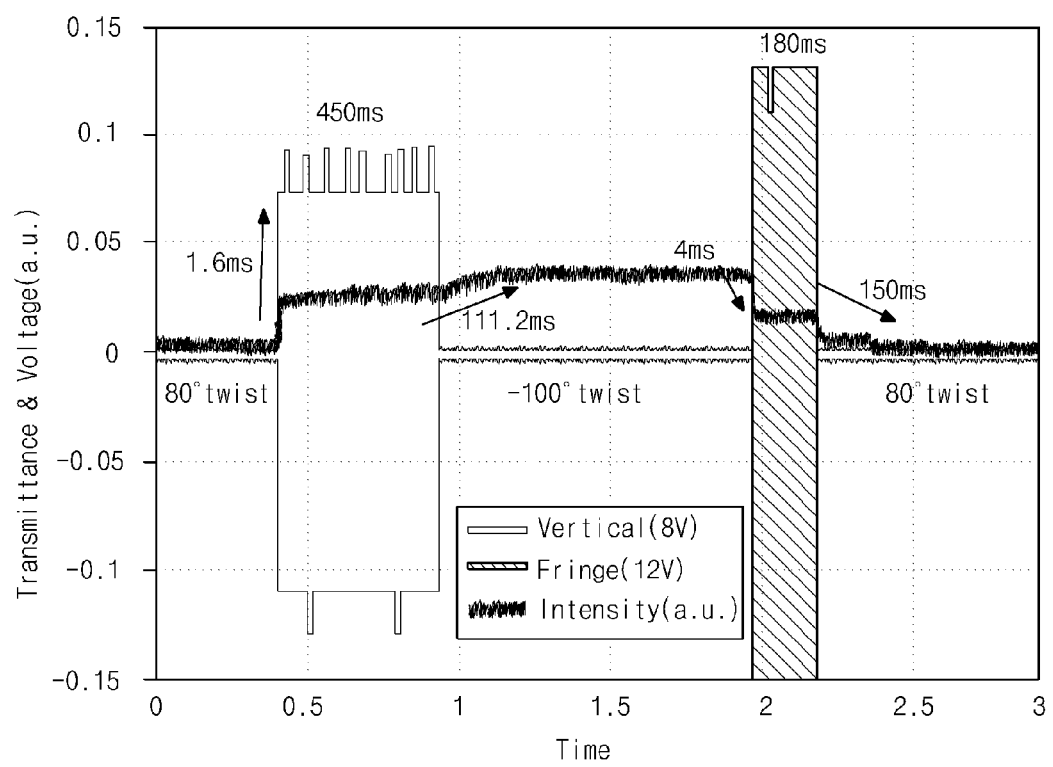
FIG. 7 is a graph of showing results of measuring response time in the memory mode of a dual mode liquid crystal display device according to the exemplary embodiment of the present invention.
Figure 8:
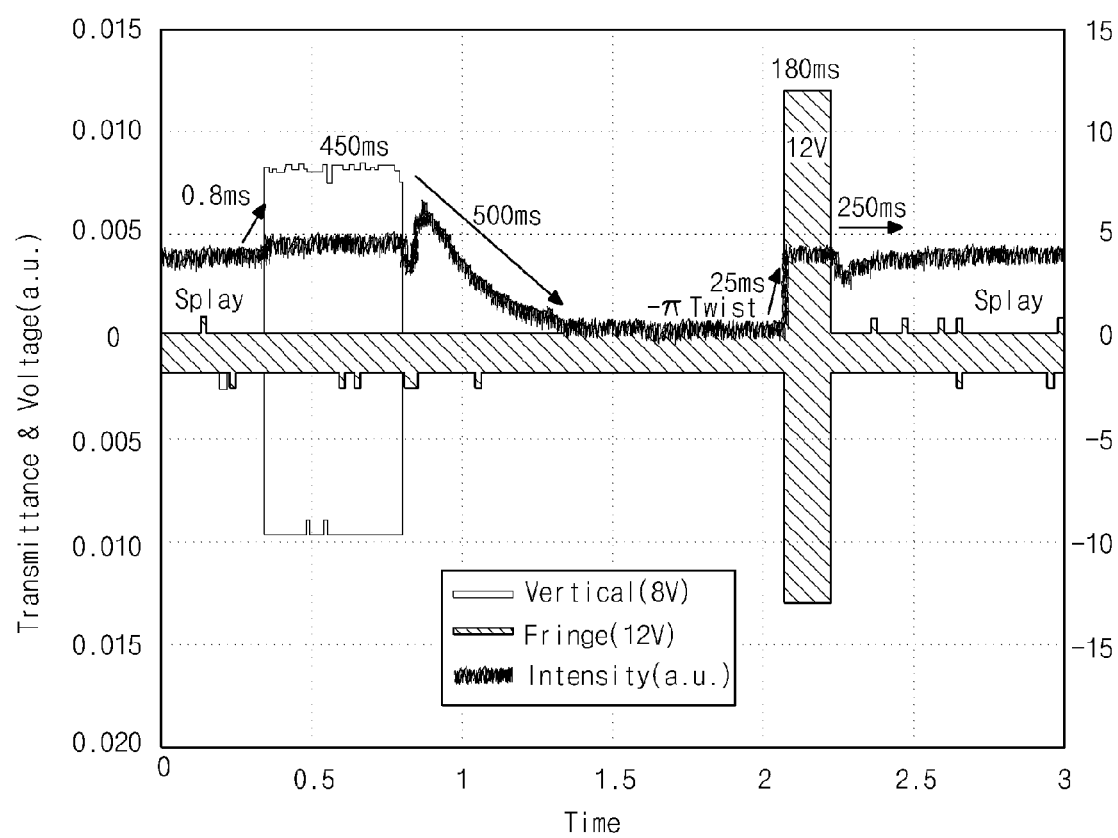
FIG. 8 is a graph of showing results of measuring response time in the memory mode of a related art liquid crystal display device.

FIG. 7 is a graph of showing results of measuring response time in the memory mode of a dual mode liquid crystal display device according to the exemplary embodiment of the present invention. FIG. 8 is a graph of showing results of measuring response time in the memory mode of a related art liquid crystal display device using a splay state, a twist state, a bend state and a vertical alignment state of a liquid crystal layer.

Referring to FIG. 7, in the dual mode liquid crystal display device of the present invention, a period for the 80 degree twist state, the −100 degree twist state and the 80 degree twist state again is at least 896.8 ms, which is a sum of 1.6 ms, 450 ms, 111.2 ms, 4 ms, 180 ms and 150 ms. On the other hand, in FIG. 8, a period for the splay state, the −π it twist state and the splay state again is at least 1405.8 ms.

Therefore, the dual mode liquid crystal display device has faster response time than the related art liquid crystal display device using the splay state, the twist state, the bend state and the vertical alignment state of the liquid crystal layer.

The dual mode liquid crystal display device can be selectively driven in the memory mode and the dynamic mode. The same arrangement of the liquid crystal molecules is used for the black state of the memory mode and the dynamic mode. Thus, the black property and the contrast ratio are superior, and the qualities of displayed images are excellent.

In addition, the dual mode liquid crystal display device of the present invention has an improved effect in response time as compared with the related art liquid crystal display device using the four states of the liquid crystal layer.

Moreover, since the dual mode liquid crystal display device of the present invention is a reflective type, the backlight unit is not required, and the power consumption is minimized. Thus, the device has a thin profile and a light weight.

It will be apparent to those skilled in the art that various modifications and variations can be made in the COG type LCD device of the present invention without departing from the spirit or scope of the invention. Thus, it is intended that the present invention cover the modifications and variations of this invention provided they come within the scope of the appended claims and their equivalents.

What is claimed is:

1. A dual mode liquid crystal display device including a memory mode and a dynamic mode, comprising:
   first and second substrates facing each other and including a display area and a non-display area;
   a first electrode on an inner surface of the first substrate and having a plate shape;
   a first insulating layer on the first electrode;
   a second electrode and a third electrode on the first insulating layer, the second and third electrodes being spaced apart from each other and extending along a first direction;
   an auxiliary line in the non-display area, wherein one end of all third electrodes in the display area are connected to the auxiliary line;
   a fourth electrode on an inner surface of the second substrate; and
   a liquid crystal layer interposed between the first and second substrates and including chiral dopants,
   wherein liquid crystal molecules of the liquid crystal layer are stably arranged in a first twist state and a second twist state, and
   wherein the first and second twist states are used for the memory mode and the second twist state and a vertical alignment state, in which the liquid crystal molecules are vertically arranged with respect to the first and second substrates, are used for the dynamic mode.

2. The device according to claim 1, further comprising a compensation film and a polarizer sequentially disposed on an outer surface of the second substrate.

3. The device according to claim 2, wherein the compensation film has a slow axis of 70 degrees when an absorption axis of the polarizer is defined as zero degree, and the compensation film has a retardation value of 189 nm to 191 nm based on a wavelength of 550 nm.

4. The device according to claim 2, wherein the compensation film includes a first and second retardation films, which have slow axes of 70 degrees and have retardation values of 40 nm and 150 nm, respectively, based on a wavelength of 550 nm when an absorption axis of the polarizer is defined as zero degree.

5. The device according to claim 1, further comprising a first alignment layer on the second and third electrodes and a second alignment layer on the fourth electrode,
   wherein the first alignment layer has a first alignment direction of −40 degrees with respect to a second direction perpendicular to the first direction, and the second alignment layer has a second alignment direction of +40 degrees with respect to the second direction.

6. The device according to claim 5, wherein the chiral dopants are included in the liquid crystal layer such that a d/p value is within a range of −0.04 to −0.013, wherein d is a thickness of the liquid crystal layer and p is a pitch of a helical structure of the liquid crystal layer.

7. The device according to claim 6, wherein the liquid crystal molecules are stably twisted in ±a degree and ±a±nπ degree directions, wherein a is an angle between the first alignment direction of the first alignment layer and the second alignment direction of the second alignment layer and n is a natural number.

8. The device according to claim 7, wherein the first twist state is ±a degree twist state and the second twist state is ±a±nπ degree twist state.

9. The device according to claim 8, wherein the first twist state is −100 degree twist state, the second twist state is 80 degree twist state, and the d/p value is −0.027.

10. The device according to claim 1, further comprising a first thin film transistor and a second thin film transistor on the inner surface of the first substrate, wherein the first thin film transistor is connected to the first electrode and the second thin film transistor is connected to the second electrode.

11. The device according to claim 10, further comprising a gate line and first and second data lines on the inner surface of the first substrate, wherein the first thin film transistor is connected to the gate line and the first data line and the second thin film transistor is connected to the gate line and the second data line.

12. The device according to claim 10, further comprising first and second gate lines and a data line on the inner surface of the first substrate, wherein the first thin film transistor is connected to the first gate line and the data line and the second thin film transistor is connected to the second gate line and the data line.

13. The device according to claim 1, further comprising a reflector between the first substrate and the first electrode.

14. The device according to claim 13, wherein the reflector has an uneven surface of an embossing structure.

15. The device according to claim 1, further comprising a color filter layer on an inner surface of the second substrate, wherein the color filter layer is disposed between the fourth electrode and the second substrate.

16. The device according to claim 1, wherein the liquid crystal layer is put in the first twist state when no voltage is applied to the first, second, third and fourth electrodes, the liquid crystal layer is put in the second twist state when a first voltage is applied between the second and third electrodes in the first twist state and then the first voltage is off, the liquid crystal layer is put in the vertical alignment state when a second voltage is applied between the first and fourth electrodes in the second twist state, and the liquid crystal layer is put in the first twist state when a third voltage higher than the second voltage is applied to the first and fourth electrodes in the vertical alignment state and then the third voltage is off,
   wherein the first twist state produces white, the second twist state produces black, and the vertical alignment state produces white having grey levels, and
   wherein the liquid crystal layer has a lowest energy in the first and second twist states and an arrangement of the liquid crystal molecules is maintained in the first and second twist states without continuously applying voltages.

17. The device according to claim 16, wherein the second voltage is within a range of 1V to 10V and the third voltage is within a range of 11V to 25V.

18. A method of driving a dual mode liquid crystal display device including a memory mode and a dynamic mode, the display device having first and second substrates facing each other and including a display area and a non-display area, a first electrode on an inner surface of the first substrate and having a plate shape, a first insulating layer on the first electrode, a second electrode and a third electrode on the first insulating layer, the second and third electrodes being spaced apart from each other and extending along a first direction, a fourth electrode on an inner surface of the second substrate, and a liquid crystal layer interposed between the first and second substrates and including chiral dopants, wherein liquid crystal molecules of the liquid crystal layer are stably arranged in a first twist state and a second twist state, the method comprising:

operating the display device in the memory mode by using the first and second twist states; and operating the display device in the dynamic mode by using the second twist state and a vertical alignment state in which the liquid crystal molecules are vertically arranged with respect to the first and second substrates.

19. The method of claim 18, wherein the display device further comprises an auxiliary line in the non-display area, wherein one end of all third electrodes in the display area are connected to the auxiliary line.

* * * * *